No. 861,618. PATENTED JULY 30, 1907.
M. D. STOCKING.
SUPPLEMENTAL WHEEL.
APPLICATION FILED AUG. 1, 1906.

Witnesses:
E. Behel.
C. Clark

Inventor:
Milton D. Stocking
By A. O. Behel
Atty.

UNITED STATES PATENT OFFICE.

MILTON D. STOCKING, OF LINDENWOOD, ILLINOIS.

SUPPLEMENTAL WHEEL.

No. 861,618.

Specification of Letters Patent.

Patented July 30, 1907.

Application filed August 1, 1906. Serial No. 328,810.

*To all whom it may concern:*

Be it known that I, MILTON D. STOCKING, a citizen of the United States, residing at Lindenwood, in the county of Ogle and State of Illinois, have invented certain new and useful Improvements in Supplemental Wheels for Motor-Cars, of which the following is a specification.

The object of this invention is to provide a supplemental wheel for motor cars which can readily be attached to a disabled wheel of the car, which enables the car to be run until such time as repairs to the main wheel can be made.

Figure 1:
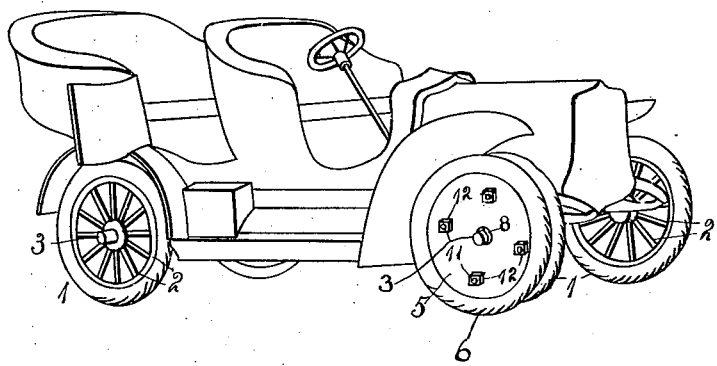
Figure 2:
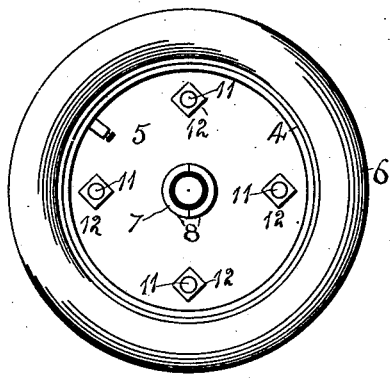
Figure 3:
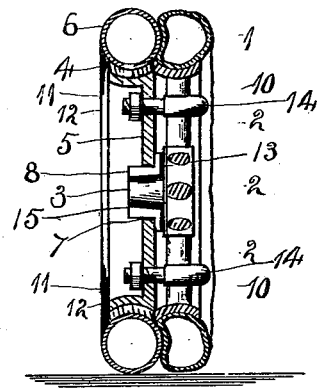
Figure 4:
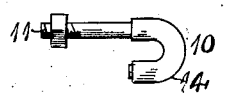
Figure 5:
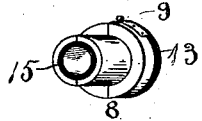

In the accompanying drawings. Figure 1 is a perspective view of a motor car equipped with one of my improved supplemental wheels. Fig. 2 is a face representation of a supplemental wheel. Fig. 3 is a vertical section through the main and supplemental wheels. Fig. 4 is a representation of one of the hooks employed to connect the supplemental wheel with the main wheel. Fig. 5 is an isometrical representation of the bushing.

In the motor car shown in the drawings, the wheels 1 are each of the usual construction made up with the spokes 2 and outwardly extending hub 3.

My improved supplemental wheel has a rim 4 and a web 5 riveted together. The tire 6 is of the usual construction and is connected to the rim 4. The web has a central opening 7. A bushing 8, in this instance in two sections are connected at their upper portions by the hook 9. The outer face of this bushing is covered with rubber or leather 13.

When one of the wheels of the motor car becomes disabled owing to the tire being cut or punctured, that section of the frame having the disabled wheel, is jacked up. A leather or rubber lining 15 is secured to the inside of the bushing. The bushing 8 is then placed around the hub 3 of the disabled wheel and the central opening 7 of the web 5 receives the bushing 8. The hooks 10 provided with leather or rubber covering 14 are placed in connection with the spokes of the disabled wheel and their screw-threaded ends 11 extend through openings in the web 5 and receive nuts 12 on their projecting ends. The nuts are turned up hard against the web which will clamp the supplemental wheel against the disabled wheel so that their rims are in contact. The frame is then lowered so that the weight of that portion of the frame will be sustained by the supplemental wheel. By thus connecting the supplemental wheel to a disabled main wheel the car can be run to a place where the main wheel can be repaired. As all touring cars carry an extra tire my supplemental wheel will occupy no more space than the extra tire. When the supplemental wheels are manufactured for the trade it may be necessary to provide a plurality of bushings in order that a proper fit may be made to the hub of the disabled wheel. It is intended to carry the tire of the supplemental wheel inflated in order to save time in making the attachment.

I claim as my invention.

1. A supplemental wheel for motor cars having a central opening, a two part bushing for the opening and having an enlarged head portion, a flexible lining for the interior of the bushing and a flexible lining for the outer face of the head portion of the bushing.

2. A supplemental wheel for motor cars having a central opening, a two part bushing for the opening and having an enlarged head portion, a flexible lining for the interior of the bushing, a flexible lining for the outer face of the head portion of the bushing and means connecting the sections of the bushing.

MILTON D. STOCKING.

Witnesses:
A. O. BEHEL,
E. BEHEL.